Feb. 28, 1939.   G. W. ROLLIN   2,148,647
APPARATUS FOR FRACTIONATING LIQUIDS AND VAPORS
Filed Dec. 2, 1935
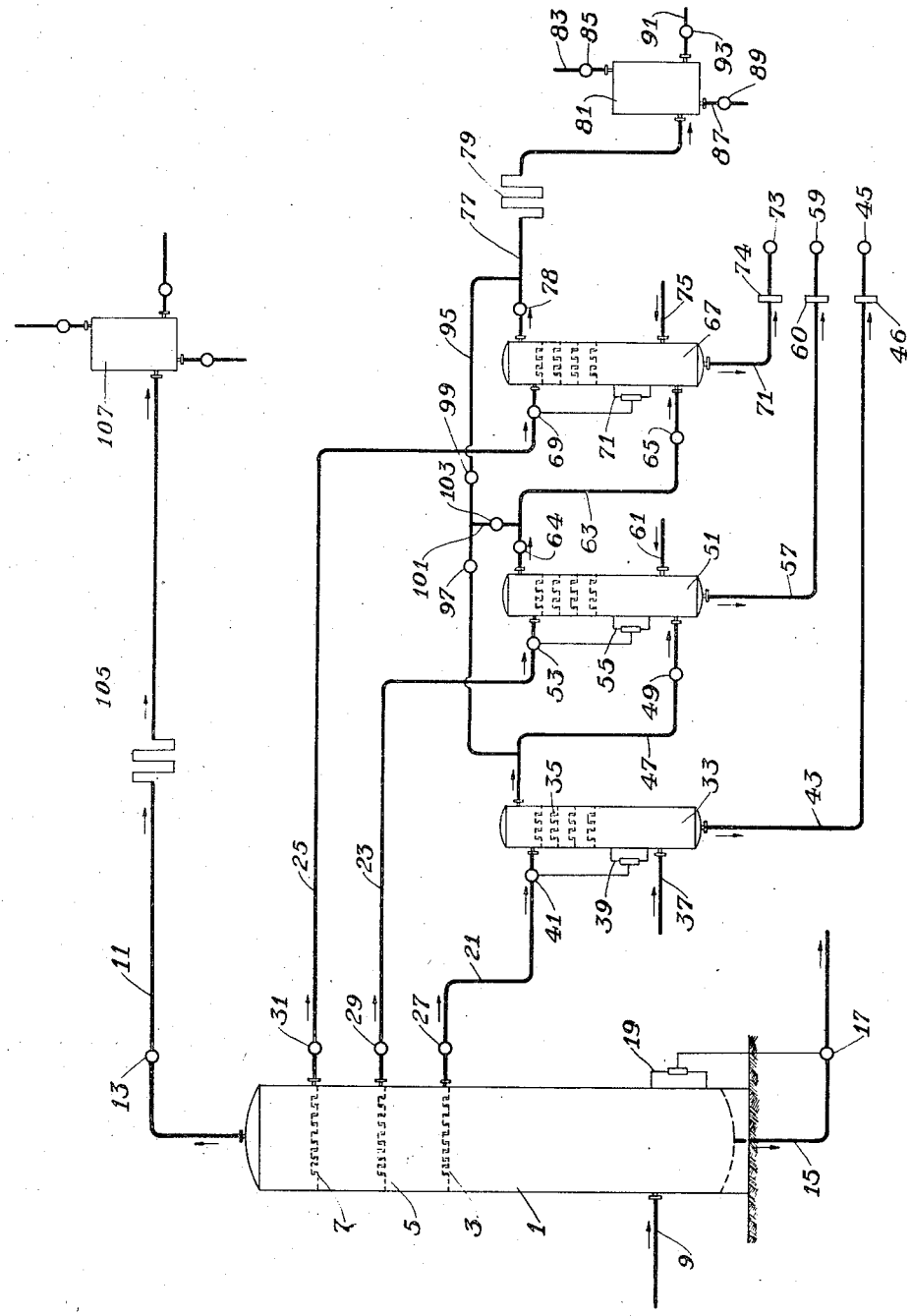
INVENTOR
George W. Rollin
BY Edward H. Lang
ATTORNEY

UNITED STATES PATENT OFFICE 2,148,647

APPARATUS FOR FRACTIONATING LIQUIDS AND VAPORS

George W. Rollin, Chicago, Ill., assignor to The Pure Oil Company, Chicago, Ill., a corporation of Ohio Application December 2, 1935, Serial No. 52,445

2 Claims. (Cl. 196—94)

This invention relates to apparatus for fractionating liquids and vapors, and more particularly relates to stripping side streams withdrawn from a fractionating tower.

It has heretofore been proposed to strip intermediate condensates formed in a fractionating tower by isolating the several condensates, passing steam therethrough to vaporize the lighter ends, and recombining the steam and vapors with the vapors in the main fractionating tower. In accordance with this practice, if more than one side cut is stripped, steam is introduced separately into each stripper. The large amount of steam required and the vapors formed in the stripping columns greatly increases the burden at the top of the fractionating tower. Moreover, the steam from each stripper is condensed without further utilization thereby adding to the cost of fractionation.

In accordance with my invention, the disadvantages inherent in present methods of side stream stripping are eliminated. I provide a series of stripping columns connected in series whereby condensates of definite boiling ranges may be passed to separate columns and the vapors and steam from the column in which condensate of highest boiling range is stripped, are passed serially through columns containing successively lower boiling range condensates. The final vapors from the stripping columns are condensed without being permitted to re-enter the main fractionating tower. In this manner the load is removed from the fractionating tower and the vapors and steam from one stripping column are utilized to assist in removing light vapors from condensates in succeeding columns. The result is more efficient fractionation of the side cuts and reduced cost of operation due to the fact that smaller fractionating towers may be used and the amount of steam may be considerably reduced.

My invention will be more clearly understood by referring to the following description and the accompanying drawing, of which The single figure is a diagrammatic vertical view of apparatus illustrating the invention.

Referring to the drawing, numeral 1 indicates a fractionating tower having suitable bubble plates 3, 5, and 7. A line 9 is provided adjacent the bottom of the tower for introducing heated liquid and/or vapors. A line 11 having valve 13 therein is connected to the top of the tower for withdrawing vapors therefrom. A line 15 having valve 17 is provided for withdrawing residue from the bottom of the tower. The valve 17 is automatically controlled by the liquid level control device 19 which cooperates with the valve to maintain a fixed level of residue in the bottom of the tower 1.

The lines 21, 23, and 25, having valves 27, 29, and 31 respectively, are connected to the side of the tower 1 immediately above the plates 3, 5, and 7 respectively. Although for purposes of illustration I have shown three lines connected to the tower, it will be apparent that the number may be greater or less depending upon the number of side streams it is desired to withdraw. The line 21 connects with the upper part of a stripping column 33 which may be suitably equipped with bubble plates 35. A line 37 is provided for introducing steam or other gaseous fluid into the column 33 adjacent the bottom thereof. A liquid level control device 39 is connected to the valve 41 in the line 21 to regulate the flow of condensate from the tower 1 into the column 33 in accordance with the level of condensate in the bottom thereof. A line 43 having valve 45 and flow indicating meter 46 is connected to the bottom of the column 33 for the purpose of permitting withdrawal of unvaporized condensate to storage, either continuously or intermittently. A line 47 having valve 49 is connected with the top of the column 33 to withdraw uncondensed vapors and steam therefrom.

The line 47 is connected to the lower end of a second stripping column 51 which corresponds substantially to the column 33. The line 23 is connected to the upper part of the column 51 and the valve 53, actuated by the liquid level control device 55, controls the flow of condensate from the tower 1 into the column 51. The column 51 is provided with a line 57 having valve 59 and flow indicating meter 60 to withdraw unvaporized condensate and also with an auxiliary line 61 for the purpose of introducing steam or other gaseous fluid. A line 63 controlled by valves 64 and 65 is provided for withdrawing uncondensed vapors and steam from the top of the column 51.

The line 63 is connected to the bottom of a third stripping column 67 which is a duplicate of the preceding column. Line 25 is connected to the upper part of the column 67 and the valve 69, actuated by liquid level control device 71, controls the flow of condensate from the tower 1 into the column 67. Line 71 having valve 73 and flow indicating meter 74 provides for withdrawal of unvaporized condensate from the bottom of the column. Line 75 is connected to the lower part of the column in order to provide means for introducing steam or other gaseous fluid. The line 77 controlled by valve 78, is connected to the top of column 67 and provides means for withdrawing uncondensed vapors from the column. Vapors passing through line 77 are condensed in condenser 79 and pass into receiver 81. Any uncondensed gas may be withdrawn from the receiver 81 through the line 83 controlled by valve 85. Water may be withdrawn through the line 87 controlled by valve 89, and condensate may be withdrawn through line 91 controlled by valve 93.

A by-pass line 95 controlled by valves 97 and 99 connects line 47 to line 77 at a point between valve 78 and condenser 79. A line 101 controlled by valve 103 connects the by-pass 95 at a point intermediate the valves 97 and 99 with the line 63 at a point intermediate the valves 64 and 65. It will be apparent that by proper manipulation of the valves in the various lines connecting the stripping columns and in the by-pass lines, any desired stripping column may be isolated and the system can be operated with one, two, or three columns on stream.

The vapors from the top of the fractionating tower 1 may be condensed in condenser 105 and passed into receiver 107 where water, gas, and condensate may be separated in the same manner as described in connection with the receiver 81. Instead of separately condensing the vapors from the stripping columns and from the fractionating tower, the vapors may be joined in a common line and condensed together.

The operation will be described in connection with the fractionation of mineral oil but it is to be understood that the invention is not limited thereto but is applicable to fractionation of other liquids such as organic compounds which can be purified by fractionation. The oil which has previously been heated to vaporization temperature or vapors which have been segregated from oil residue are introduced through the line 9 adjacent the bottom of tower 1. The ascending vapors are fractionated by passing in contact with the condensate which is flowing downwardly through the tower and which collects on the various plates. A heavy condensate collected on the plate 3 may be withdrawn through the line 21, passed into the upper part of the column 33 where it flows downwardly in counter-current contact with steam introduced through the line 37. The light ends are removed from the condensate and the unvaporized condensate which has been reduced to the desired boiling range is withdrawn through the line 43. Condensate may be withdrawn intermittently or continuously, and withdrawal may be controlled by hand operation or by means of automatic valves. The uncondensed vapors and steam pass into the second stripping column where they pass in counter-current contact with a lighter condensate introduced through the line 23. The vapors and steam cause vaporization of the lighter ends of this condensate and condensation of the heavier vapors introduced from the preceding column. If necessary, a small amount of additional steam may be introduced through line 61. The column 51 is maintained at lower temperature than the column 33 since the desired cut will be of lower temperature boiling range than that produced in the preceding column. Uncondensed vapors and steam from the column 51 then pass into the column 67 where they pass counter-current to the lightest condensate introduced through the line 25. The heavier vapors introduced through the line 63 are condensed while the lighter vapors in the condensate introduced through line 25 are vaporized and pass out of the tower through the line 73 and are condensed. Additional steam may be introduced if necessary through the line 75. The column 67 is maintained at a lower temperature than the preceding columns in order to obtain the lightest cut.

In this manner final fractions may be withdrawn through lines 43, 57, and 71, and the vapors and steam leaving one column are utilized in fractionating the condensate in the succeeding columns.

Any desired side stream may be cut out so that the apparatus may be made to operate with one or two side stream strippers. When it is desired to make only the heaviest and lightest side stream cuts, the steam and vapors from the stripper producing the highest temperature boiling range cut may be by-passed around the intermediate stripper into the stripper producing the lower boiling range cut; or if it is desired to make only the two heavier cuts, the stripper 67 may be by-passed. It will be obvious that any single or any two cuts can be made by isolating the other columns from the system.

It will be seen therefore that the stripping of the various side cuts is accomplished with the minimum amount of steam or other fluid and that no additional burden is placed upon the main fractionating tower.

What I claim is:

1. Apparatus for fractionating vapors comprising a vertical fractionating tower, means for collecting a plurality of condensates of successively lower boiling range at different levels in said tower, means for transferring each condensate from said tower to a separate stripping column, means for automatically controlling the transfer of condensate from said tower to each stripping column, means for optionally preventing passage of condensate from said tower to any stripping column, means for passing steam into said stripping columns, means for passing vapors from a stripping column charged with a higher boiling range condensate serially through stripping columns charged with successively lower boiling range condensates, means for passing vapors from a stripping column charged with condensate of higher boiling range to and through any desired stripping column charged with condensate of lower boiling range without passing the vapors through any other stripping column, and means for condensing vapors from said fractionating tower and said stripping columns, and means for withdrawing condensate from each stripping column, without passing through the remaining stripping columns.

2. Apparatus in accordance with claim 1 in which the vapors from said fractionating column are condensed separately from the vapors from said stripping columns.

GEORGE W. ROLLIN.